US008249728B2

(12) United States Patent
Kesch et al.

(10) Patent No.: US 8,249,728 B2
(45) Date of Patent: Aug. 21, 2012

(54) METHOD FOR OPERATING A MANAGEMENT SYSTEM OF FUNCTION MODULES

(75) Inventors: Bernd Kesch, Hemmingen (DE); Hans Hillner, Ludwigsburg (DE); Matthias Knirsch, Schwieberdingen (DE); Alexander Hinz, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 952 days.

(21) Appl. No.: 11/662,583

(22) PCT Filed: Sep. 13, 2005

(86) PCT No.: PCT/EP2005/054547

§ 371 (c)(1),
(2), (4) Date: Nov. 12, 2008

(87) PCT Pub. No.: WO2006/034960

PCT Pub. Date: Apr. 6, 2006

(65) Prior Publication Data

US 2009/0083574 A1 Mar. 26, 2009

(30) Foreign Application Priority Data

Sep. 28, 2004 (DE) ......................... 10 2004 046 874

(51) Int. Cl.

| | |
|---|---|
| ***G05B 11/01*** | (2006.01) |
| ***G06F 7/00*** | (2006.01) |
| ***G06F 11/00*** | (2006.01) |
| ***G06F 19/00*** | (2006.01) |

(52) U.S. Cl. ....... 700/21; 701/29.1; 701/30.1; 701/31.4; 714/3; 714/E11.054; 714/E11.021; 714/25

(58) Field of Classification Search .................... 700/21; 714/704
See application file for complete search history.

(56) References Cited

U.S. PATENT DOCUMENTS

| | | | | |
|---|---|---|---|---|
| 3,687,121 A * | 8/1972 | Tuzson | ......................... | 123/444 |
| 4,009,695 A * | 3/1977 | Ule | ............................ | 123/90.13 |
| 4,024,775 A * | 5/1977 | Anderson et al. | ............... | 475/78 |
| 5,337,320 A * | 8/1994 | Kung | .............................. | 714/26 |
| 5,388,189 A * | 2/1995 | Kung | .................... | 714/E11.157 |
| 5,627,750 A * | 5/1997 | Kono et al. | ..................... | 700/28 |

(Continued)

FOREIGN PATENT DOCUMENTS

DE 1973116 11/1967

(Continued)

OTHER PUBLICATIONS

Alpha Technologies, "Alphagen Cable Series: Engine Control Module (ECM) Operation and Maintenance Manual", Oct. 2003, obtained online at www.alpha.com.*

*Primary Examiner* — Mohammad Ali
*Assistant Examiner* — Kelvin Booker
(74) *Attorney, Agent, or Firm* — Kenyon & Kenyon LLP

(57) ABSTRACT

Methods for operating a management system that manages a large number of first function modules and second function modules. An inhibitor module I sets first control statuses to designating blocking when associated events are detected by an event detecting device, and then the management system no longer makes associated first function modules available for execution. The inhibitor module I sets second control statuses to designating executable when associated events are detected by an event detecting device, and then the management system makes associated second function modules available for execution.

16 Claims, 3 Drawing Sheets

U.S. PATENT DOCUMENTS

| | | | | |
|---|---|---|---|---|
| 5,721,817 | A * | 2/1998 | Kurihara et al. | 714/E11.134 |
| 5,749,061 | A * | 5/1998 | Kono et al. | 701/68 |
| 5,788,599 | A * | 8/1998 | Adachi et al. | 477/45 |
| 5,964,813 | A * | 10/1999 | Ishii et al. | 701/35 |
| 6,006,146 | A * | 12/1999 | Usui et al. | 701/31.9 |
| 6,067,009 | A * | 5/2000 | Hozuka et al. | 340/459 |
| 6,115,653 | A * | 9/2000 | Bergstrom et al. | 701/29 |
| 6,134,488 | A * | 10/2000 | Sasaki et al. | 701/32.8 |
| 6,182,807 | B1 * | 2/2001 | Saito et al. | 191/2 |
| 6,292,741 | B1 * | 9/2001 | Bitzer et al. | 701/115 |
| 6,321,150 | B1 * | 11/2001 | Nitta | 701/29 |
| 6,401,891 | B1 * | 6/2002 | Saito et al. | 191/2 |
| 6,405,330 | B1 * | 6/2002 | Hanf et al. | 714/712 |
| 6,408,998 | B1 * | 6/2002 | Saito et al. | 191/2 |
| 6,426,957 | B1 * | 7/2002 | Hauser et al. | 370/413 |
| 6,479,973 | B2 * | 11/2002 | Saito et al. | 323/282 |
| 6,507,918 | B1 * | 1/2003 | Last et al. | 714/25 |
| 6,604,032 | B1 * | 8/2003 | Moller | 701/29 |
| 6,654,669 | B2 * | 11/2003 | Eisenmann et al. | 701/36 |
| 6,718,959 | B2 * | 4/2004 | Kim | 123/692 |
| 6,769,521 | B2 * | 8/2004 | Saito et al. | 191/2 |
| 6,856,891 | B2 * | 2/2005 | Yasui | 701/109 |
| 6,925,372 | B2 * | 8/2005 | Yasui | 701/109 |
| 6,981,176 | B2 * | 12/2005 | Fruehling et al. | 714/E11.034 |
| 6,985,809 | B2 * | 1/2006 | Yasui | 701/109 |
| 6,988,481 | B2 * | 1/2006 | Sen et al. | 123/198 F |
| 7,000,599 | B2 * | 2/2006 | Kirkpatrick | 123/490 |
| 7,019,626 | B1 * | 3/2006 | Funk | 340/438 |
| 7,028,819 | B2 * | 4/2006 | Saito et al. | 701/532 |
| 7,039,557 | B2 * | 5/2006 | Mayer et al. | 702/184 |
| 7,059,115 | B2 * | 6/2006 | Yasui | 60/285 |
| 7,093,588 | B2 * | 8/2006 | Edwards | 123/525 |
| 7,124,013 | B2 * | 10/2006 | Yasui | 701/103 |
| 7,124,742 | B1 * | 10/2006 | Kirkpatrick | 123/490 |
| 7,143,728 | B1 * | 12/2006 | Yasui | 123/90.15 |
| 7,181,330 | B2 * | 2/2007 | Shimojo et al. | 701/102 |
| 7,188,020 | B2 * | 3/2007 | Yasui et al. | 701/103 |
| 7,245,225 | B2 * | 7/2007 | Kamio et al. | 340/648 |
| 7,318,018 | B2 * | 1/2008 | Yasui et al. | 701/103 |
| 7,643,930 | B2 * | 1/2010 | Yasui et al. | 701/103 |
| 7,647,157 | B2 * | 1/2010 | Yasui | 701/103 |
| 7,664,595 | B2 * | 2/2010 | Groer et al. | 701/114 |
| 7,761,221 | B2 * | 7/2010 | Abe et al. | 701/105 |
| 7,954,312 | B2 * | 6/2011 | Gresens | 60/286 |
| 8,086,366 | B2 * | 12/2011 | Bertosa et al. | 701/33.2 |
| 2001/0002449 | A1 * | 5/2001 | Eisenmann et al. | 701/1 |
| 2001/0028241 | A1 * | 10/2001 | Saito et al. | 323/282 |
| 2002/0043964 | A1 * | 4/2002 | Saito et al. | 323/282 |
| 2002/0077782 | A1 * | 6/2002 | Fruehling et al. | 702/185 |
| 2003/0001434 | A1 * | 1/2003 | Saito et al. | 307/10.1 |
| 2003/0023328 | A1 * | 1/2003 | Yasui | 700/28 |
| 2003/0098211 | A1 * | 5/2003 | Saito et al. | 191/3 |
| 2003/0125865 | A1 * | 7/2003 | Yasui | 701/109 |
| 2004/0050034 | A1 * | 3/2004 | Yasui | 60/276 |
| 2004/0094138 | A1 * | 5/2004 | Yasui et al. | 123/688 |
| 2004/0176887 | A1 * | 9/2004 | Kent et al. | 701/30 |
| 2004/0231634 | A1 * | 11/2004 | Sen et al. | 123/198 F |
| 2004/0249552 | A1 * | 12/2004 | Di Cola et al. | 701/103 |
| 2005/0121005 | A1 * | 6/2005 | Edwards | 123/525 |
| 2005/0146302 | A1 * | 7/2005 | Kamio et al. | 318/647 |
| 2005/0168072 | A1 * | 8/2005 | Saito et al. | 307/10.1 |
| 2005/0216179 | A1 * | 9/2005 | Yasui et al. | 701/115 |
| 2006/0080025 | A1 * | 4/2006 | Wang et al. | 701/106 |
| 2006/0217871 | A1 * | 9/2006 | Shimojo et al. | 701/102 |
| 2006/0229777 | A1 * | 10/2006 | Hudson et al. | 701/29 |
| 2006/0266316 | A1 * | 11/2006 | Yasui | 123/90.16 |
| 2006/0282211 | A1 * | 12/2006 | Yasui | 701/103 |
| 2007/0083304 | A1 * | 4/2007 | Yamada | 701/29 |
| 2007/0129875 | A1 * | 6/2007 | Yasui et al. | 701/103 |
| 2007/0179691 | A1 * | 8/2007 | Grenn et al. | 701/29 |
| 2007/0284937 | A1 * | 12/2007 | Deiml et al. | 303/115.3 |
| 2008/0047268 | A1 * | 2/2008 | Isogai et al. | 60/608 |
| 2008/0114507 | A1 * | 5/2008 | Ruth et al. | 701/29 |
| 2008/0119977 | A1 * | 5/2008 | Beuter | 701/29 |
| 2008/0162023 | A1 * | 7/2008 | Groer et al. | 701/114 |
| 2008/0219866 | A1 * | 9/2008 | Kwong et al. | 417/410.1 |
| 2008/0228337 | A1 * | 9/2008 | Bauerle et al. | 701/29 |
| 2008/0319638 | A1 * | 12/2008 | Yasui et al. | 701/105 |
| 2009/0173557 | A1 * | 7/2009 | Joos et al. | 180/65.265 |
| 2009/0204234 | A1 * | 8/2009 | Sustaeta et al. | 700/29 |
| 2009/0204237 | A1 * | 8/2009 | Sustaeta et al. | 700/36 |
| 2009/0204245 | A1 * | 8/2009 | Sustaeta et al. | 700/99 |
| 2009/0210081 | A1 * | 8/2009 | Sustaeta et al. | 700/99 |
| 2011/0041003 | A1 * | 2/2011 | Pattar et al. | 714/4.3 |

FOREIGN PATENT DOCUMENTS

| | | |
|---|---|---|
| EP | 1081632 | 3/2001 |
| JP | 1997123894 | 5/1997 |
| JP | 10061766 | 3/1998 |
| WO | WO9713064 | 4/1997 |

* cited by examiner

METHOD FOR OPERATING A MANAGEMENT SYSTEM OF FUNCTION MODULES

FIELD OF THE INVENTION

The present invention relates to a method for operating a management system of function modules. In particular, the invention relates to a management system in which individual function modules are capable of being released or not released for execution using an inhibitor module.

BACKGROUND INFORMATION

Although the present invention will be described hereinafter with reference to a diagnosis system management (DSM) for an engine control system, the present invention is not limited thereto.

A diagnosis system management (DSM) is used inter alia for controlling an operating procedure of an engine. The control takes place in accordance with predefined program sequences and on the basis of events which are sensed by sensors and communicated to the DSM. In addition, the DSM enables external analysis modules to record and analyze the program sequences during or after test phases and/or during routine operation of an engine.

Referring to FIG. 5, a schematic layout of a conventional DSM V for a control system H of an engine will be described. The operating procedure of an engine includes sequential and/or parallel execution of a plurality of function modules h1-h3, such as, for example, an actuator for spark plugs, a fuel tank ventilation system and an air-fuel mixture adapter. Those individual function modules h1-h3 are executed by a control system H. DSM V makes function modules h1-h3 available to control system H for execution, with DSM V selecting those function modules h1-h3 from a first set F of first function modules f1-f4 and a second set G of second function modules g1-g2.

Upon occurrence of events e1-e4, especially error messages, such as, for example, a defective spark plug, it is sensible for some of first function modules f1-f4 to be no longer made available to control system H for execution, so that, for example, gasoline is no longer injected into the corresponding cylinder having the defective spark plug. For that purpose, an event detecting device E is provided in DSM V. Event detecting device E detects events e1-e4 inter alia by sensors that monitor, for example, the spark plug. If an event e1-e4 is detected, an inhibitor module I is called. Inhibitor module I has a database which links event e1-e4 with first function modules f1-f4. In the example illustrated in FIG. 1, event e1 is associated with first function modules f1 and f4. Upon occurrence of event e1, execution of first function modules f1 and f4 is accordingly to be prevented. First function modules f1-f4 are assigned control statuses s1-s4 which are stored in registers in a memory device K. Inhibitor module I sets control statuses s1-s4 to designating blocking when their associated events e1-e4 have occurred. In the case described above, therefore, control statuses s1 and s4 are set to designating blocking. Management system V interrogates control statuses s1-s4. If those control statuses s1-s4 are set to designating blocking, management system V does not release the corresponding first function modules f1-f4 for execution and thus no longer makes them available to control system H for execution.

By reading memory device K it is possible to ascertain which function modules f1-f4 were blocked in the course of a test phase or a drive. This is advantageous for diagnosis of engine operation by the analysis module.

Second function modules g1-g2 are executed only if a corresponding event e1-e4 occurs or has occurred. Management system V is able inter alia to make a second function module g1-g2 available to control system H instead of a blocked function module f1-f4. Which of the second function modules g1-g2 will be made available is ascertained by management system V inter alia on the basis of internal algorithms of management system V. This may involve, for example, individual function modules f1-f4, g1-g2 being assigned priorities and, upon blocking of a prioritized function module, the next-in-priority function module being made available.

A disadvantage with this method is that it is not transparent to an external analysis module which of second function modules g1-g2 is capable of being made available by DSM V after an event e1-e4 has occurred. For an analysis, an analysis module therefore requires knowledge of the internal algorithms of management system V and must therefore be adapted to every new DSM.

A further disadvantage is that management system V has to examine for a second function module g1-g2 all the events e1-e4 associated with second function module g1-g2 before management system V is able to establish whether that second function module g1-g2 is or is not releasable for execution by control system H.

SUMMARY OF THE INVENTION

It is an object of the present invention to provide a method for operating a management system, which method solves the problems mentioned above.

The present invention provides a method for operating a management system that manages a large number of first and second function modules, wherein a first function module is not released for execution if an associated first control status designates that first function module as blocking and does not release a second function module for execution if a second control status designates that second function module as non-executable. In a first database, there is associated with each first function module a first event set which is empty or has at least one event, and a second database associates with each second function module a second event set which is either empty or has at least one event. If an event detecting module detects one or more events, an inhibitor module is executed. That inhibitor module sets all first control statuses to designating blocking if at least one of the detected events is included in the one first event set associated with the first control status and sets all the second control statuses to designating executable if at least one of the detected events is included in the event set associated with the second control status.

One advantage of the present invention is that a second control status is assigned to each second function module, which second control status indicates whether the second function module may or may not be made available by the management system for execution. In that manner, expenditure on resources is reduced, as is the time taken by the management system to establish whether the corresponding second function module may or may not be made available by examining the corresponding second control status.

A preferred development of the present invention provides that the inhibitor module stores the first and the second control status in a memory device and the management system reads out the first and second control status from the memory device. An external analysis module is thus able to detect which of the first and second function modules is blocked or released solely by reading out the memory device.

A preferred development of the present invention provides that each function module is associated in the memory device with a status register, the first control status being storable in a first memory location of the status register and the second control status being storable in a second memory location of the status register.

A preferred development of the present invention provides that the first and the second memory locations are an identical memory location.

A preferred development of the present invention provides that the first and the second memory locations each have the same memory value when the first control status is designating blocking and the second control status is designating non-executable or the first control status is designating non-blocking and the second control status is designating executable. As a result, advantageously it is not necessary to distinguish according to first and second function modules when the registers are being evaluated.

A preferred development of the present invention provides that a third memory location is provided in the status register, which third memory location indicates whether the management system is evaluating in relation to a function module the first or the second control status.

A preferred development of the present invention provides that the inhibitor module is executed every time the event detecting module has detected a single event.

A preferred development of the present invention provides that, in a first step, a re-set takes place, wherein all first control statuses are set to designating non-blocking and all second control statuses are set to designating non-executable.

A preferred development of the present invention provides that, after a re-set, a loop interrogates all possible events as to their occurrence and the first and second control statuses are set according to the occurrence or non-occurrence of the events.

A preferred development of the present invention provides that the first and second control statuses are set, after execution of the loop, only if an event occurs.

BRIEF DESCRIPTION OF THE DRAWINGS

Exemplary embodiments of the present invention will be described in detail below with reference to the accompanying Figures, in which.

DETAILED DESCRIPTION

Figure 1:
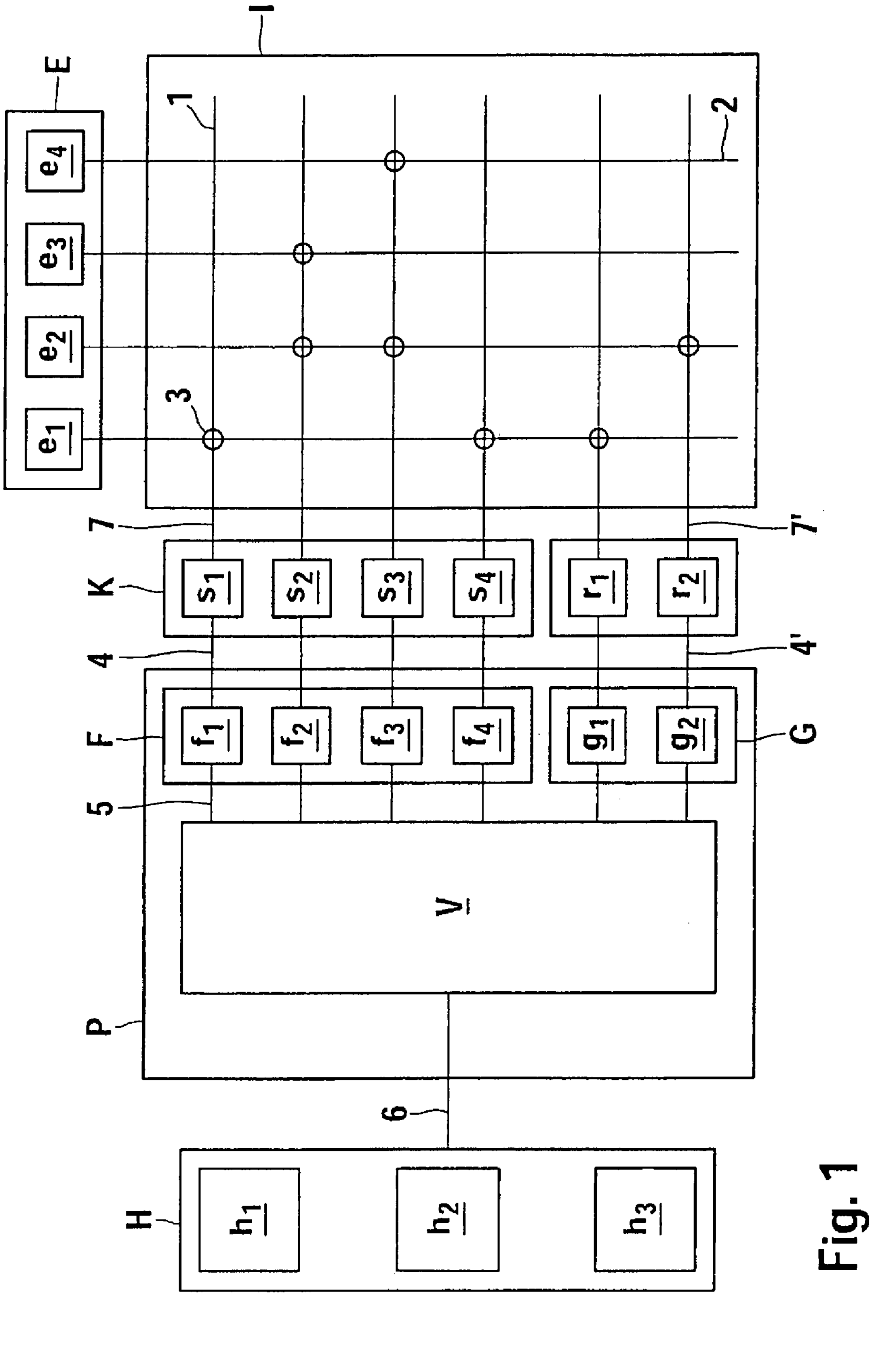
FIG. 1 is a schematic illustration for the linking of a management system with events.

In FIG. 1, a schematic illustration of one embodiment of the present invention is shown. A management system V manages a first set of functions F and a second set of functions G, the first set of functions F including first function modules f1-f4 and the second set of functions G including second function modules g1-g2. The number of function modules is to be regarded here merely as an example. Function modules f1-f4, g1-g2 provide functions for actuating the spark plugs, ventilating the cylinders, adapting the mixture and the like. Management system V makes one or more of those function modules available to a control system H which executes the function modules h1-h3 made available.

Each first function module f1-f4 is assigned a first control status s1-s4 via a link 4. That first control status has two statuses: "designating non-blocking" and "designating blocking". If first control status s1-s4 is designating blocking, first function module f1-f4 is not made available by management system V, i.e., control system H is not able to execute that function module f1-f4. In the converse case, it is possible for first function module f1-f4 to be released by management system V.

First control status s1-s4 is set to designating blocking if an event e1-e4 that a first database associates with that first control status s1-s4 occurs. In the case of first control status s2 in the illustration in FIG. 1, events e2 and e3, for example, are linked to first control status s2, as shown graphically by an interconnection 3, event paths 2 and function paths 1. Evaluation of the first database having the interconnections 3 of first control statuses s1-s4 and events e1-e4 is performed by an inhibitor module I which at the same time sets the corresponding first control statuses s1-s4 to designating blocking if the corresponding event e1-e4 occurs.

Second function modules g1-g2 are assigned second control statuses r1-r2. Second control statuses r1-r2 have the following statuses: "designating non-executable" or "designating executable". In the case of designating executable, second function modules g1-g2 are released by management system V to control system H for execution and may therefore be executed by control system H. In the other case, second function modules g1-g2 are not released for execution and therefore it is not possible for them to be executed by control system H.

Second control statuses r1-r2 are set, in conformity with first control statuses s1-s4, on the basis of events e1-e4. In this operation, second control statuses r1-r2 are set to designating executable if an event e1-e4 that corresponds to them occurs. The linking of second control statuses r1-r2 with events e1-e4 is performed by a second database. The second database is likewise evaluated by inhibitor module I and the inhibitor module sets second control statuses r1-r2 accordingly to designating executable upon occurrence of an event e1-e4.

Control statuses s1-s4, r1-r2 are stored by inhibitor module I in a memory device K. Management system V is able to access memory device K through an interface and reads out control statuses s1-s4, r1-r2 in order to decide which function modules f1-f4, g1-g2 are releasable for execution by control system H. Advantageously, management system V needs to read only control statuses s1-s4, r1-r2 for that decision and individual examination of events e1-e4 is not necessary for release of second function modules g1-g2.

Events e1-e4 are detected by an event detecting device E. Event detecting device E has a plurality of sensors that monitor the current operating state of an engine. In one embodiment, event detecting device E is able to trigger a call-up of inhibitor module I, in a second embodiment inhibitor module I cyclically interrogates event detecting device E as to the presence of an event e1-e4.

Figure 2:
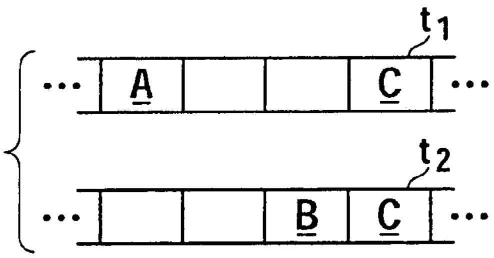
FIG. 2 is a schematic illustration of the memory allocation of a register to first and second control statuses.

In FIG. 2, a schematic illustration of two registers t1 and t2 of memory device K of one embodiment is shown. First control status s1-s4 is stored in a first memory area A of register t1. Second control status r1-r2 is stored in a second memory area B of register t2. In the embodiment illustrated, first memory area A and second memory area B are at non-identical memory locations. Management system V reads memory locations A, B using a method function that selects the memory location corresponding to first function module s1-s4 or second function module r1-r2[1]. In addition, a third memory location C may be provided in registers t1, t2, which memory location C indicates which of the two memory locations A, B is authoritative for the release or blocking of the function module. This is provided for external analysis modules, which accordingly do not require a priori knowledge of the function modules associated with registers t1, t2. It is also possible for third memory location C to be used by management system V.

Figure 3:
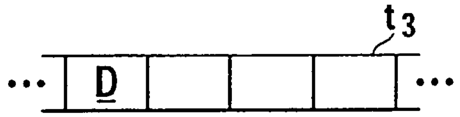
FIG. 3 is a schematic illustration of a further embodiment of the memory disposition of a first and/or second control status in a register.

In FIG. 3, a schematic illustration of a register t3 of a further embodiment is shown. In this case, first control status s1-s4 and second control status r1-r2 are stored in the same memory area D. In this instance, a memory value for designating blocking of a first control status s1-s4 corresponds to a designating non-executable of a second control status r1-r2, and a memory value for designating non-blocking of a first control status s1-s4 corresponds to designating executable of a second control status r1-r2. Thus, in the case of the one memory value, the function module may be made available by management system V and, in the case of the second memory value, must be blocked, irrespective of whether a first or a second function module is assigned to the register. Advantageously, therefore, neither management system V nor an external analysis module has to distinguish between first and second control statuses s1-s4, r1-r2. It is, however, necessary for all first and second control statuses to be set in a first step of the method, in accordance with a procedure described in FIG. 4; this may be done inter alia at new start of the control system.

Figure 4:
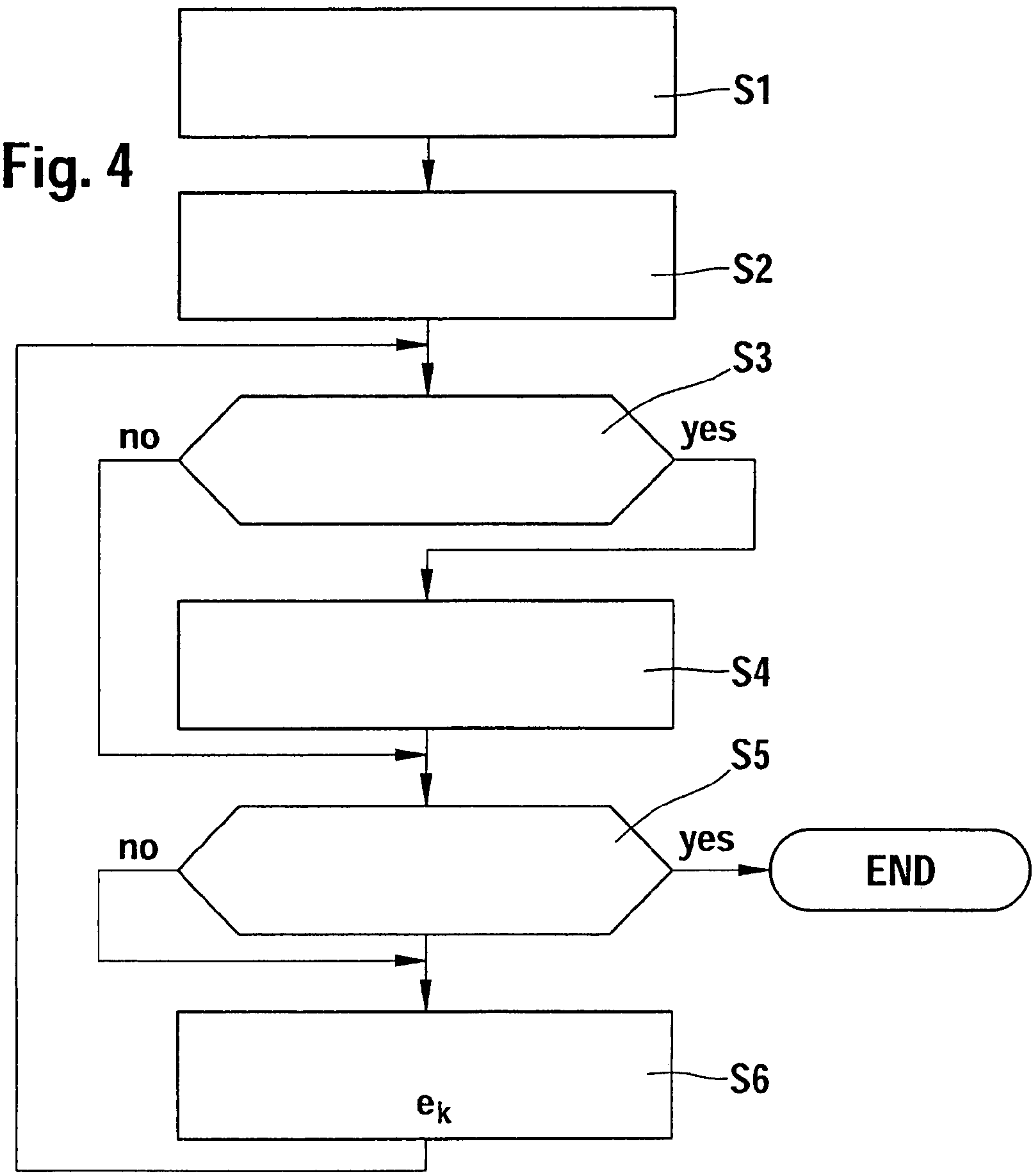
FIG. 4 is a schematic illustration of a flow diagram of a first step of an embodiment.
Figure 5:
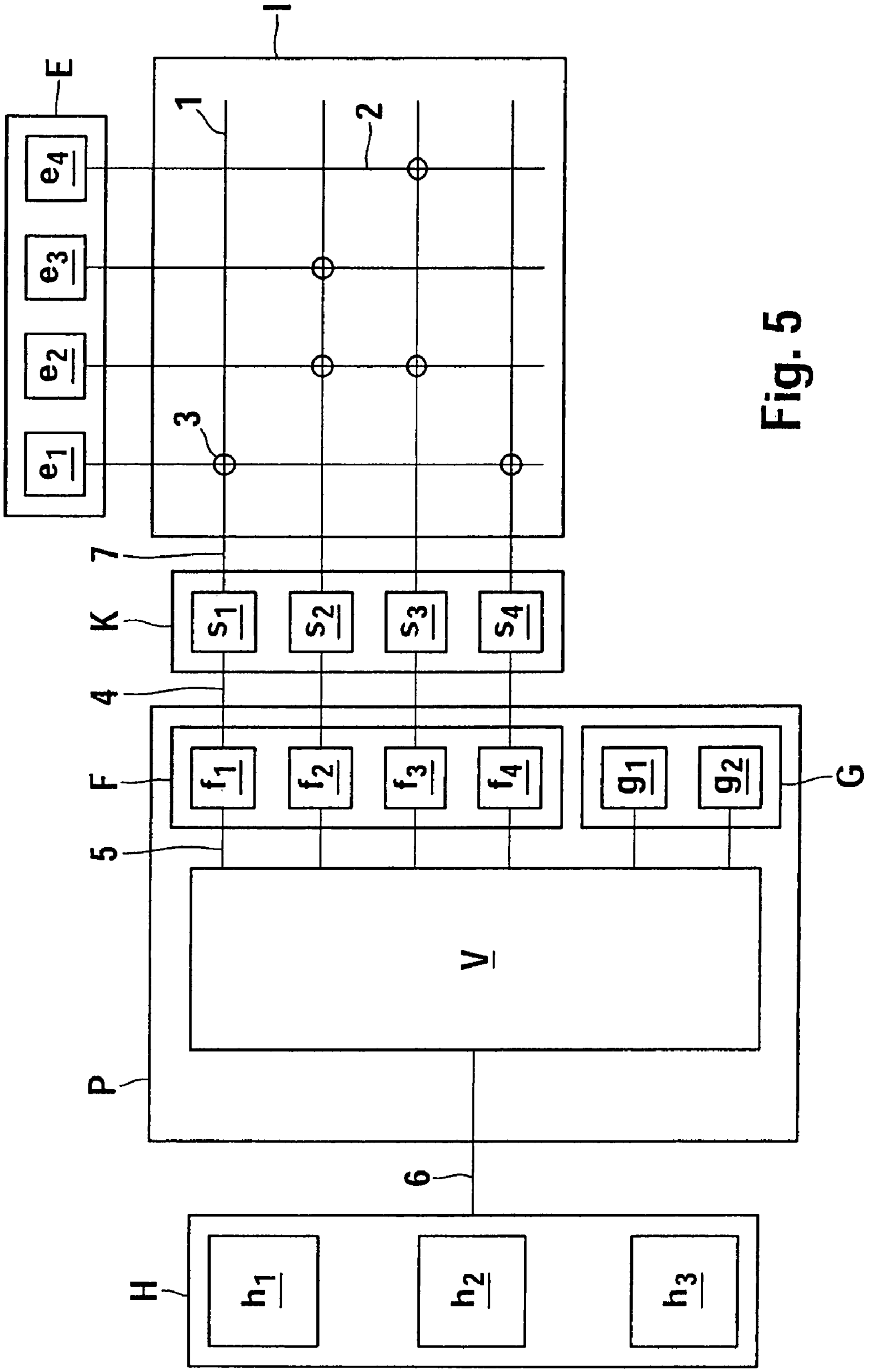
FIG. 5 is a schematic illustration of linking a management system with events in accordance with the related art.

FIG. 4 shows schematically a flow diagram of a first step of an embodiment. At the start, re-setting of all control statuses is carried out by setting all first control statuses s1-s4 to designating executable S1 and all second control statuses r1-r2 to designating blocking S2. This corresponds to the initial situation where all first function modules f1-f4 may be released by management system V and all second function modules g1-g2 are not released by management system V. Once first and second control statuses f1-f4, g1-g2[1] have been set accordingly, it may be advantageous to run a loop that interrogates all events e1-e4 linked to management system V as to whether they have occurred or not S3, and subsequently, if applicable, execute inhibitor module I S4 so that first and second control statuses s1-s4, r1-r2 are set according to the events e1-e4 that have occurred. The advantage of executing such a loop becomes apparent especially when event detecting module E reacts only to a change, that is, to the occurrence of a new event e1-e4. Events that have already been detected previously or permanently detected events e1-e4 would not be detected by such an event detecting device E. Accordingly, first and second control statuses s1-s4, r1-r2 would possibly remain incorrectly set after a re-set. On the other hand, it is advantageous, once all control statuses are set, to react only to change, that is, to new events e1-e4 that occur, in order to minimize system load due to event detecting device E and execution of inhibitor module I. Advantageously, inhibitor module I resorts to a first and a second database, which are centrally accessible. By adapting the first and second databases it is possible to adapt the control behavior of management system V to new management settings using a central data change.

Although the present invention has been described with reference to exemplary embodiments it is not limited thereto. In particular, definite assignment of a function module to first and second function modules is not absolutely necessary, but rather a function module may belong to both sets.

LIST OF REFERENCE SYMBOLS

1 function path
2 event path
3 interconnection
I inhibitor module
P process control device
K memory device
V management system
s1-s4 first control status
r1,r2 second control status
A,B,C first, second, third memory location
D memory location
t1,t2,t3 status register
F set of first function modules
f1-f4 first function modules
H control system
h1-h3 executable function modules
E event detecting device
e1-e4 events
G set of second function modules
g1,g2 second function modules

What is claimed is:

1. A method for operating a management system that manages a large number of first function modules and second function modules, comprising:

stopping the management system from releasing the first function module for execution if an associated first control status designates the first function module as blocked;

stopping the management system from releasing the second function module for execution if a second control status designates the second function module as non-executable, wherein a first database associates with each first function module a first event set which is empty or contains at least one event, and a second database associates with each second function module a second event set which is empty or has at least one event;

detecting one or more events with an event detecting device; and executing an inhibitor module which, on the basis of the first database, sets all the first control statuses whose associated event set contains at least one of the detected events to designating blocking and, on the basis of the second database, sets all the second control statuses whose associated event set contains at least one of the detected events to designating executable.

2. The method as recited in claim 1, wherein the inhibitor module stores the first control status and the second control status in a memory device and the management system reads out the first control status and the second control status from the memory device.

3. The method as recited in claim 1, wherein each function module is associated in the memory device with a status register, the first control status being storable in a first memory location of the status register and the second control status being storable in a second memory location of the status register.

4. The method as recited in claim 3, wherein the first memory location and the second memory location are an identical memory location.

5. The method as recited in claim 3, wherein the first memory location and the second memory location have a first memory value when the first control status is designating blocking or the second control status is designating non-executable, and have a second memory value when the first control status is designating non-blocking or the second control status is designating executable.

6. The method as recited in claim 5, wherein in the status register a third memory location is provided which indicates whether the management system is evaluating in relation to a function module the first control status or the second control status.

7. The method as recited in claim 1, wherein the inhibitor module is executed every time the event detecting module has detected a single event.

8. The method as recited in claim 1, wherein in a first step a re-set takes place, wherein all first control statuses are set to designating non-blocking and all second control statuses are set to designating non-executable.

9. The method as recited in claim 8, wherein after a re-set a loop interrogates all possible events as to their occurrence, and the first control statuses and the second control statuses are set according to the occurrence or non-occurrence of the events.

10. The method as recited in claim 9, wherein the first control statuses and the second control statuses are set, after execution of the loop, only if an event occurs.

11. The method as recited in claim 1, wherein the inhibitor module stores the first control status and the second control status in a memory device and the management system reads out the first control status and the second control status from the memory device, and wherein each function module is associated in the memory device with a status register, the first control status being storable in a first memory location of the status register and the second control status being storable in a second memory location of the status register.

12. The method as recited in claim 11, wherein the first memory location and the second memory location are an identical memory location.

13. The method as recited in claim 11, wherein the first memory location and the second memory location have a first memory value when the first control status is designating blocking or the second control status is designating non-executable, and have a second memory value when the first control status is designating non-blocking or the second control status is designating executable.

14. The method as recited in claim 13, wherein in the status register a third memory location is provided which indicates whether the management system is evaluating in relation to a function module the first control status or the second control status.

15. The method as recited in claim 1, wherein the inhibitor module is executed every time the event detecting module has detected a single event, and wherein in a first step a re-set takes place, wherein all first control statuses are set to designating non-blocking and all second control statuses are set to designating non-executable.

16. The method as recited in claim 15, wherein after a re-set a loop interrogates all possible events as to their occurrence, and the first control statuses and the second control statuses are set according to the occurrence or non-occurrence of the events, and wherein the first control statuses and the second control statuses are set, after execution of the loop, only if an event occurs.

* * * * *